United States Patent
Moganty et al.

(10) Patent No.: US 10,193,187 B2
(45) Date of Patent: Jan. 29, 2019

(54) IONIC LIQUIDS FOR SOLVATING LITHIUM POLYSULFIDES

(71) Applicant: NOHMs Technologies, Inc., Rochester, NY (US)

(72) Inventors: Surya Moganty, Henrietta, NY (US); Jonathan Lee, Redmond, WA (US); Gabriel Torres, Rochester, NY (US); Luigi Abbate, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 667 days.

(21) Appl. No.: 14/714,219

(22) Filed: May 15, 2015

(65) Prior Publication Data

US 2015/0340738 A1 Nov. 26, 2015

Related U.S. Application Data

(60) Provisional application No. 61/993,717, filed on May 15, 2014.

(51) Int. Cl.
| | |
|---|---|
| *H01M 10/0569* | (2010.01) |
| *H01M 10/0525* | (2010.01) |
| *H01M 10/052* | (2010.01) |
| *H01M 10/0568* | (2010.01) |

(52) U.S. Cl.
CPC ..... *H01M 10/0569* (2013.01); *H01M 10/052* (2013.01); *H01M 10/0525* (2013.01); *H01M 10/0568* (2013.01); *H01M 2300/0037* (2013.01)

(58) Field of Classification Search
None
See application file for complete search history.

(56) References Cited

U.S. PATENT DOCUMENTS

| | | | | |
|---|---|---|---|---|
| 8,252,461 | B2 * | 8/2012 | Vu | H01M 2/166 |
| | | | | 429/220 |
| 2011/0008683 | A1 * | 1/2011 | Kolosnitsyn | H01M 4/40 |
| | | | | 429/337 |
| 2014/0154588 | A1 * | 6/2014 | Archer | H01M 10/052 |
| | | | | 429/335 |

FOREIGN PATENT DOCUMENTS

WO    WO2013009731    *    1/2013

* cited by examiner

*Primary Examiner* — Sarah A. Slifka
(74) *Attorney, Agent, or Firm* — Bond, Schoeneck & King, PLLC; Joseph Noto

(57) ABSTRACT

A method of modifying the solubility of polysulfide anions using functionalized ionic liquids.

16 Claims, 3 Drawing Sheets

IONIC LIQUIDS FOR SOLVATING LITHIUM POLYSULFIDES

TECHNICAL FIELD

The embodiments in this invention generally describe a method of modifying the solubility of polysulfide anions.

BACKGROUND

In a lithium-sulfur cell, the reduction of sulfur to lithium sulfide is a critical series of reactions that provide a large theoretical capacity of 1672 mAh/g sulfur. One of many challenges in this system is the solubility of generated lithium polysulfides during the charge/discharge process. These polysulfides derived from the reduction of elemental sulfur are soluble in organic electrolytes and can be undesirably reduced at the anode. Polysulfide species can also accumulate at the surface of the cathode and be further reduced to lower order polysulfides, such as $Li_2S_2$ or $Li_2S$. The insulating nature of these lower order polysulfides block the electron pathway on the carbon cathode.

There is a need in the art to control the various effects of the polysulfide anion species in the lithium-sulfur system. One method is by changing the solubility properties of the electrolyte system.

SUMMARY

The present invention provides for functionalized ionic liquids, and ionic liquid-based electrolyte compositions that allow for solvation of lithium polysulfides. This allows for electrolyte formulations which exhibit high ionic conductivity, excellent cathodic and anodic stability, wide temperature range operation, and high voltage electrochemical stability for secondary lithium batteries, in particular lithium-sulfur batteries. This invention optimizes nonflammable electrolyte formulations based on ionic liquids, alkali metal salts, organic co-solvents, and film forming species that address problems associated with polysulfide dissolution and polysulfide shuttling, flammability, and thermal instability in the lithium-sulfur electrochemical system.

An aspect of this invention pertains to a method of controlling the solvation of polysulfide anions in a mixture by incorporating one or more functionalized ionic liquids described by the formula $C^+A^-$, wherein $A^-$ is an anion selected from the group consisting of halides, nitrates, phosphates, imides, borates, phosphazines, acetates, and sulfonates; and $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one or more of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; and wherein any of the carbon or hydrogen atoms in the above moieties are further substituted with halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides.

In an embodiment, at least one of the moieties on the heterocyclic ring of the cation is an alkylsilane.

In an embodiment, at least one of the moieties is covalently bonded onto a metal or metal oxide particle.

In an embodiment, the metal oxide particle is a micro- or nano-particle.

In an embodiment, the functionalized ionic liquid is solvated up to between about 1 molar to about 10 molar concentrations of polysulfide anions.

In an embodiment, one or more functionalized ionic liquid is added to change the donor number or acceptor number of an electrolyte formulation.

In an embodiment, an organic hybrid material is added to change the donor number of acceptor number of an electrolyte formulation.

Another aspect of this invention pertains to an electrolyte formulation for secondary batteries, comprising one or more functionalized ionic liquids described by the formula $C^+A^-$, wherein $A^-$ is an anion selected from the group consisting of halides, nitrates, phosphates, imides, borates, phosphazines, acetates, and sulfonates; and $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one or more of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; and wherein any of the carbon or hydrogen atoms in the above moieties are further substituted with halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; one or more alkali metal salts; and one or more organic co-solvents.

In an embodiment, the electrolyte formulation further comprises a metal polysulfide.

In an embodiment, the cation of the one or more alkali metal salts is one or more of lithium, sodium, and magnesium.

In an embodiment, the total molar concentration of the one or more alkali metal salts in the electrolyte formulation is between about 0.1 and about 2.

In an embodiment, the organic co-solvent is one or more species selected from the group consisting of open-chain or cyclic carbonates, carboxylic acid esters, nitrites, ethers, sulfones, sulfoxides, lactones, dioxolanes, glymes, crown ethers, and any mixture thereof.

In an embodiment, the organic co-solvent is between about 5 wt % to about 85 wt % of the total electrolyte mass.

In an embodiment, the functionalized ionic liquid is between about 0.1 wt % to about 85 wt % of the total electrolyte mass.

In an embodiment, the organic-hybrid material is between about 0.1 wt % to about 10 wt % of the total electrolyte mass.

In an embodiment, the metal polysulfide is formed ex-situ and is included in the cell at a molar concentration between about 0.1 and 10.

Yet another aspect of this invention pertains to an electrochemical cell comprising a positive electrode comprising an electroactive sulfur-containing material; a negative electrode; and an electrolyte with the formulation comprising the one or more functionalized ionic liquids described by the formula C⁺A⁻, wherein A⁻ is an anion selected from the group consisting of halides, nitrates, phosphates, imides, borates, phosphazines, acetates, and sulfonates; and C⁺ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one or more of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; and wherein any of the carbon or hydrogen atoms in the above moieties are further substituted with halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; one or more alkali metal salts; and one or more organic co-solvents.

As used herein, the moieties connect the ionic liquid to metal or metal oxide particles, both of which may be micro- or nano-particles. Examples of metal oxide nanoparticles are silica and titania.

As used herein, the organic hybrid material refers the organic ionic liquid covalently bonded to the inorganic metal or metal oxide particles.

BRIEF DESCRIPTION OF THE DRAWINGS

The present invention, in accordance with one or more embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

The invention describes novel ionic liquids whose organic, heterocyclic cations have appended moieties that allow said ionic liquids to solvate polysulfides in a wide range of concentrations. The ionic liquids are also stable at a wide range of temperatures, and can be used to inhibit polysulfide shuttling in the lithium-sulfur electrochemical system. Additionally, this invention relates to the use of said ionic liquids along with other co-solvents and additives as high performance, nonflammable, wide operating temperature range electrolyte formulations for electrochemical cells.

The invention describes novel ionic liquids whose organic, heterocyclic cations have appended moieties that allow said ionic liquids to solvate polysulfide anions in a wide range of concentrations. Said ionic liquids are also stable at a wide range of temperatures, and can be used to inhibit polysulfide shuttling in the lithium-sulfur electrochemical system. Additionally, this invention relates to the use of said ionic liquids along with other co-solvents and additives as high performance, nonflammable, wide operating temperature range electrolyte formulations for electrochemical cells. Those skilled in the art are also familiar with the use of the general term ionic liquid when referring to crystalline or otherwise non-liquid forms of the same molecules.

The proposed technology incorporates the advantages of nonflammable ionic liquids and organic co-solvents to form a thermally and electrochemically stable electrolyte for lithium secondary batteries. By appending particular moieties on the heterocyclic organic cation of an ionic liquid, the solubility of polysulfides in the electrolyte can be tuned to a desired level and maximize cell capacity while simultaneously inhibiting the polysulfide shuttle phenomenon. Certain moieties can also be used to form a passivation layer on the lithium anode surface to further inhibit anode-side polysulfide reduction. Other moieties can be used to form a pseudo solid polymer electrolyte through in-situ polymerization on electrode surfaces or ex-situ polymerization for use as a standalone electrolyte medium.

Figure 1:
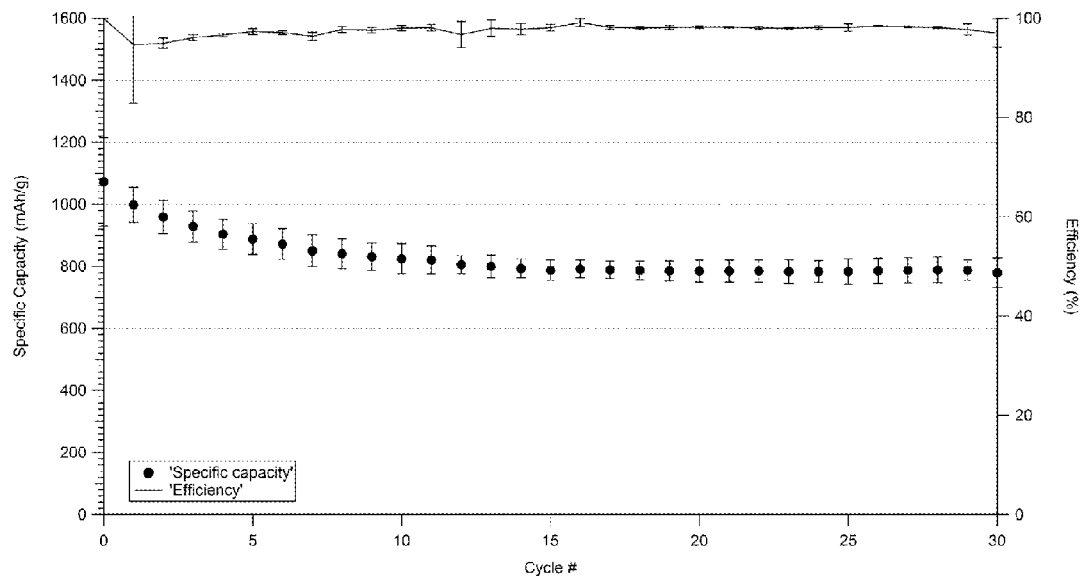
FIG. 1 is a graph of charge-discharge cycling results of the cells from Example 6 are shown as an average with 95% confidence intervals.
Figure 2:
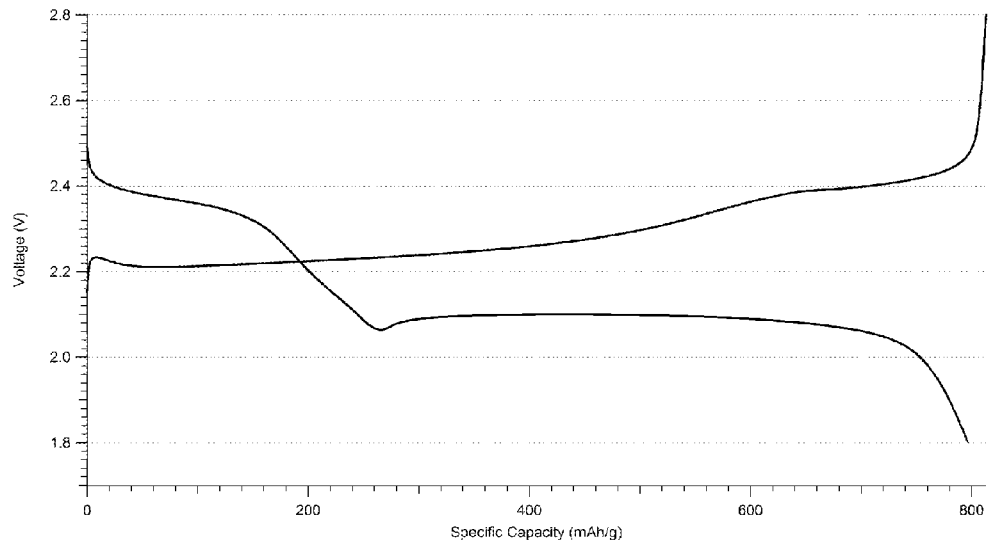
FIG. 2 is a graph of cycle 25 charge-discharge curves for a single cell from Example 6.

Charge-discharge cycling results of the cells from Example 6 are shown as an average with 95% confidence intervals in FIG. 1. In FIG. 1, the cell specific capacities are shown as solid circles using the left-hand axis and the cell coulombic efficiencies (discharge capacity divided by charge capacity expressed as a percentage) are shown as a line using the right-hand axis. Additionally, the cycle 25 charge-discharge curves of a cell from Example 6 are shown in FIG. 2. The polysulfide shuttle typically manifests itself in these experiments in a never ending charge step, and cycling stability is indicative of successful polysulfide shuttling prevention. FIG. 1 does not show the characteristic drop in coulombic efficiency associated with the polysulfide shuttle. In addition, FIG. 2 does not show a characteristic never ending plateau between 2.4 V and 2.6 V indicative of the polysulfide shuttle.

As these ionic liquids can be used to influence the solubility of polysulfide anions, it is also possible to limit the loss of active material from the cathode during discharge by lowering the solubility of polysulfide anions within the electrolyte. This effect can also be reversed to have a higher concentration of polysulfide anions in solution for the purposes of dissolving liquid cathode material or simply increasing the concentration of conducting salts.

The functionalities are typically, but not always, appended onto a nitrogen in the heterocyclic cation. Useful functionalities include but are not limited to alkanes, esters, ketones, ethers, other carboxylic acid derivatives and their sulfur analogues, cyano groups, alkenes, alkynes, and similarly halogenated or further functionalized analogues of the preceding. A preferred example is a nitrile-functionalized imidazolium cation, where the nitrile moiety allows the ionic liquid to interact with polysulfide anions in such a way as to increase their solvation or binding energy to the ionic liquid.

Functionalization of the ionic liquid as a constituent of the electrolyte also affects the overall Gutmann donor and acceptor numbers of the electrolyte. The donor number is a quantitative measure of Lewis basicity, while the acceptor number is a quantitative measure of Lewis acidity. These numbers can be used to describe the ability of a solvent to solvate ions such as the polysulfide anion or the lithium cation. These numbers, and subsequently the solvation of polysulfide anions in the electrolyte, can be further tuned by combining different ionic liquid species with different moieties as well as varying anions. For example, a mixture of nitrile functionalized imidazoliums with bromide and bis(trifluoromethanesulfonyl)imide (TFSI) anions.

EXAMPLES

The following examples are provided to illustrate certain aspects of the present invention and to aid those of skill in the art in practicing the invention. Before describing several embodiments of the invention, it is to be understood that the invention is not limited to the details of the construction or process steps set forth in the following description. The invention is capable of other embodiments and of being practiced or being carried out in various way. It will be apparent to those skilled in the art that various modifications and variations can be made to the method and apparatus of the present invention without departing from the spirit and scope of the invention. For example, ionic liquids based on different cations (e.g. piperidinium, pyrrolidinium, etc.) and anions (e.g. fluorosulfonylimide, trifluoromethanesulfonate, etc.) can be synthesized using methods similar to those described below. Thus, it is intended that the present invention include modifications and variations that are within the scope of the appended claims and their equivalents.

Example 1

A nitrile-functionalized ionic liquid was synthesized by the following method. 1-methylimidazolium (99%; Sigma Aldrich) and 1-bromopropionitrile (99%; Sigma Aldrich) are dissolved in toluene and stirred at 70° C. for 48 hours. Following this reaction, the crude product is washed with diethyl ether to remove unreacted reagents and residual solvent. The nitrile-functionalized imidazolium bromide molten salt is then dissolved in water. To this, LiTFSI (Sigma Aldrich) salt is added to initiate anion exchange. Upon completion of this reaction, the organic phase was washed with water and dissolved in dichloromethane for ease of further purification. A purification step of physisorption using an activated carbon is sometimes necessary. Dichloromethane is then removed to isolate the pure product using rotary evaporation and drying in vacuo. The purity of the ionic liquid is confirmed by 1H NMR measurements.

Example 2

An ether-functionalized ionic liquid was synthesized by the following method. 1-methylpyrrolidine (98%; Alfa Aesar) and 2-chloroethylmethyl ether (98%; Alfa Aesar) were dissolved in ethyl acetate on ice and then stirred at 65° C. for 19 days. Following this reaction, the intermediate was dissolved in deionized water and washed with ethyl acetate to remove unreacted reagents and residual solvent. The ether-functionalized pyrrolidinium chloride molten salt was then dissolved in water. To this, LiTFSI (Sigma Aldrich) salt was added to initiate anion exchange. Upon completion of this reaction, the organic phase was washed with water and redissolved in dichloromethane for ease of further purification. A purification step of physisorption using an activated carbon was sometimes necessary. Dichloromethane was then removed to isolate the pure product using rotary evaporation and drying in vacuo. The purity of the ionic liquid is confirmed by 1H NMR measurements.

Example 3

An ether-functionalized ionic liquid was synthesized by the following method. 1-methylpyrrolidine (99%; Sigma Aldrich) and 2-bromomethyl ether (90%; Alfa Aesar) were dissolved in ethyl acetate on ice and then stirred at 50° C. for 24 hours. Following this reaction, the intermediate was dissolved in deionized water and washed with ethyl acetate to remove unreacted reagents and residual solvent. The ether-functionalized pyrrolidinium chloride molten salt was then dissolved in water. To this, LiTFSI (Sigma Aldrich) salt was added to initiate anion exchange. Upon completion of this reaction, the organic phase was washed with water and dissolved in dichloromethane for ease of further purification. A purification step of physisorption using an activated carbon was sometimes necessary. Dichloromethane was then removed to isolate the pure product using rotary evaporation and drying in vacuo. The purity of the ionic liquid was confirmed by 1H NMR measurements.

Example 4

An electrolyte formulation was created using the ionic liquid of Example 2 by the following method. The ionic liquid of Example 2 was added to a base solution of 0.25 M LiTFSI (99.95% trace metal; Sigma Aldrich) and 0.5 M lithium nitrate (>99.0% BioUltra; Sigma Aldrich) in a 1:1 mixture of 1,2-dimethoxyethane (99.5% Anhydrous; Sigma Aldrich):1,3-dioxolane (99.8% Anhydrous; Sigma Aldrich), such that the number of moles of ionic liquid added was equal to the liters of base solution divided by four.

Example 5

An electrolyte formulation was created as in Example 4, but instead using the ionic liquid of Example 3.

Example 6

Three electrochemical cells were fabricated at room temperature in an inert atmosphere glovebox using the electrolyte of Example 2 by the following method. A cathode with elemental sulfur as the electroactive material (70 parts elemental sulfur, 30 parts pyrolyzed aerogel, 2 parts Ketjen Black EC-600JD (Akzo Nobel), 2 parts graphene nanoplatelets (Strem Chemicals), 1 part silica nanoparticles) was first placed into a CR2032 coin cell cathode cap, followed by a 25 micron Celgard polypropylene separator and a plastic gasket on top of the polypropylene separator. 60 microliters of the electrolyte from Example 2 were then added via micropipette, followed by a cut circle of lithium metal, a stainless steel spacer, a wave spring, and the corresponding CR2032 anode cap. After crimping the cathode and anode caps together, the cell was removed from the glovebox and let rest for 4 hours prior to electrochemical testing.

Example 7

Three electrochemical cells were fabricated as in Example 6, but instead using the electrolyte of Example 5.

Example 8

A series of lithium polysulfides with the collective molecular identity, $Li_2S_x$ (2<x<9), were synthesized in an inert atmosphere glovebox. Lithium metal (Battery Grade; Rockwood Lithium) and elemental sulfur (99% precipitated; Alfa Aesar) were stirred for 7 days at 25° C. in the presence of a 1,2-Dimethoxyethane (99.5% Anhydrous; Sigma Aldrich). An elemental ratio of 8:2 S:Li was used. After stirring, the solutions were filtered with 0.45 µm pore size glass fiber syringe filters to remove unreacted solids. To determine concentrations of polysulfide in solution, the syringe filters were dried at 60° C. in vacuo overnight to obtain a residual reactant mass.

Example 9

An electrolyte formulation was created using the ionic liquid of Example 2 and the metal polysulfide of Example 8 by the following method. LiTFSI (99.95% trace metal; Sigma Aldrich) was dissolved in the polysulfide solution of Example 8. To this, 1,3-dioxolane (99.8% Anhydrous; Sigma Aldrich) and the ionic liquid of Example 2 were added. The result was a 0.1 M LiTFSI, 0.35 M $Li_2S_8$, and 3.7 mol % of the ionic liquid in a mixture of 1:1 by volume DME:DOL.

Example 10

Three electrochemical cells were fabricated as in Example 6, but instead using the electrolyte of Example 9.

Example 11

Figure 3:
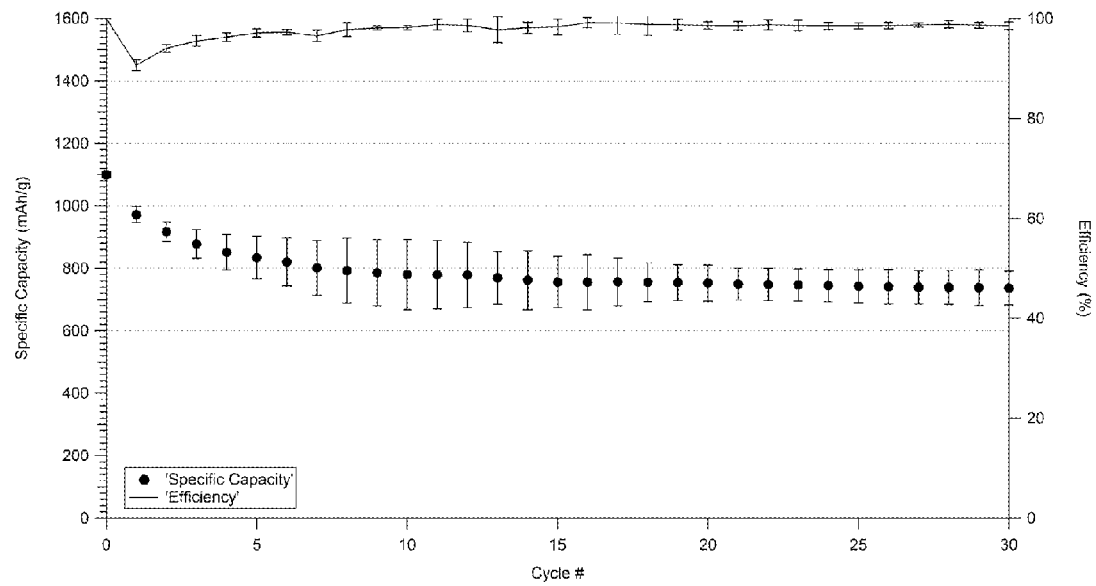
FIG. 3 is a graph of a charge-discharge cycling results of the cells from Example 7 are shown as an average with 95% confidence intervals.
Figure 4:
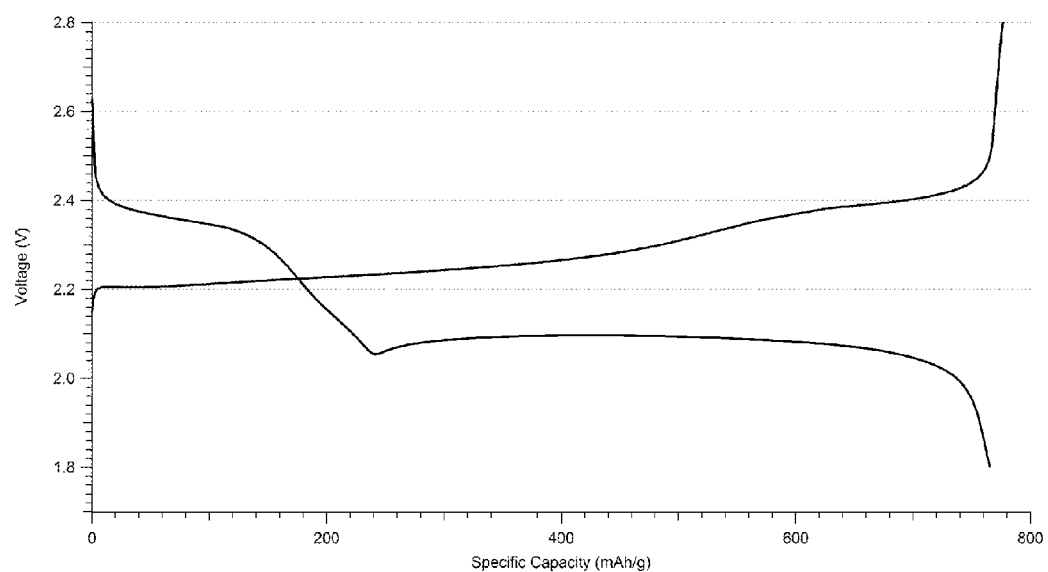
FIG. 4 is a graph of a cycle 25 charge-discharge curves of a single cell from Example 7.
Figure 5:
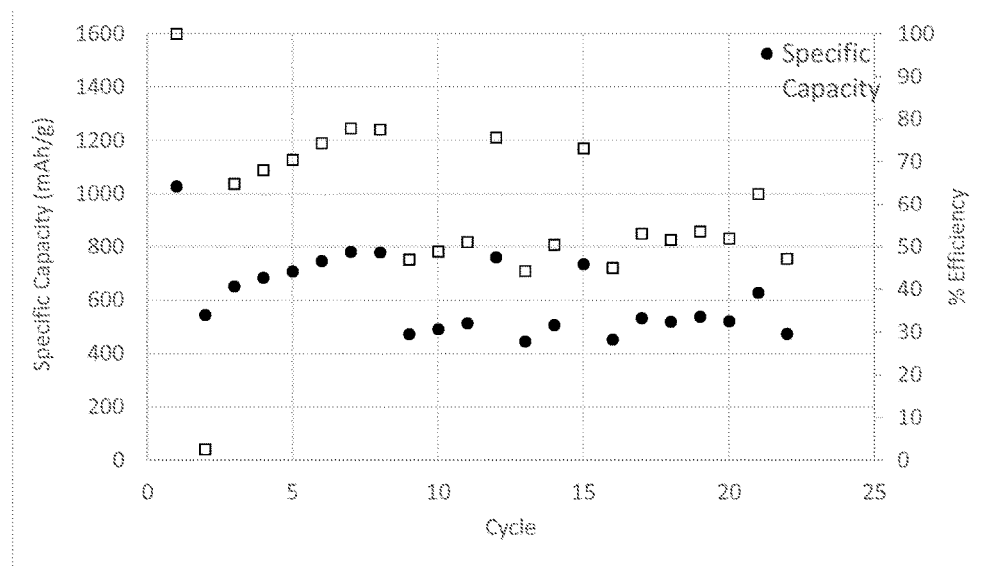
FIG. 5 is a graph of the charge-discharge cycling results of a cell from Example 10.
Figure 6:
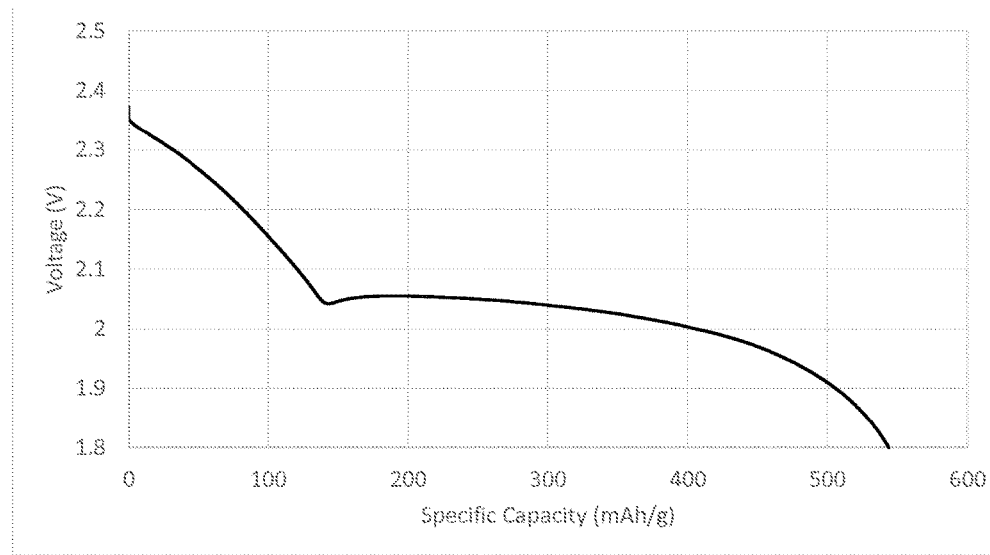
FIG. 6 is a graph of a cycle 2 discharge curve of a cell from Example 10.

Electrochemical testing of the cells of Examples 6, Example 7, and Example 9 were performed with the following setup. Cells were placed on individual testing channels which alternately discharged at constant current to 1.8V and charged to 2.8V at 0.2 C. Cells were given 1 minute rest intervals between charge and discharge steps. The polysulfide shuttle typically manifests itself in these experiments in an unending charge step, and cycling stability is indicative of successful polysulfide shuttling prevention. Charge-discharge cycling results of the cells from Example 6 are shown as an average with 95% confidence intervals in FIG. 1. Additionally, the cycle 25 charge-discharge curves of a cell from Example 6 are shown in FIG. 2. Charge-discharge cycling results of the cells from Example 7 are shown as an average with 95% confidence intervals in FIG. 3. Additionally, the cycle 25 charge-discharge curves of a cell from Example 7 are shown in FIG. 4. Charge-discharge cycling results of a cell from Example 10 is shown in FIG. 5. Additionally, the cycle 2 charge-discharge curve of a cell from Example 10 is shown in FIG. 6.

The invention describes novel ionic liquids whose organic, heterocyclic cations have appended moieties that allow said ionic liquids to solvate polysulfides in a wide range of concentrations. These ionic liquids are also stable at a wide range of temperatures. Additionally, this invention relates to the use of these ionic liquids along with other co-solvents and additives as high performance, nonflammable, wide operating temperature range electrolyte formulations for electrochemical cells.

Before describing several exemplary embodiments of the invention, it is to be understood that the invention is not limited to the details of construction or process steps set forth in the following description. The invention is capable of other embodiments and of being practiced or being carried out in various ways.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of controlling the solvation of polysulfide anions in a mixture by incorporating a plurality of a functionalized single ionic liquid molecule described by the formula $C^+A^-$, wherein
   a. $A^-$ is an anion selected from the group consisting of halides, nitrates, phosphates, imides, borates, phosphazines, acetates, and sulfonates; and
   b. $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one or more of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; and wherein any of the carbon or hydrogen atoms in the above moieties are further substituted with halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides.

2. The method of claim 1 wherein at least one of the moieties on the heterocyclic ring of the cation is an alkylsilane.

3. The method of claim 2 further comprises covalently bonding the at least one moiety onto a metal or metal oxide particle.

4. The method of claim 3 wherein the metal oxide particle is a micro- or nano-particle.

5. The method of claim 1 which comprises solvating the functionalized ionic liquid up to between about 1 molar to about 10 molar concentrations of polysulfide anions.

6. The method of claim 1 which comprises changing the donor number or acceptor number of an electrolyte formulation by adding one or more functionalized ionic liquids.

7. The method of claim 1 which comprises changing the donor number or acceptor number of an electrolyte formulation by adding an organic hybrid material.

8. An electrolyte formulation for secondary batteries, comprising:

a functionalized single ionic liquid molecule described by the formula $C^+A^-$, wherein $A^-$ is an anion selected from the group consisting of halides, nitrates, phosphates, imides, borates, phosphazines, acetates, and sulfonates; and $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one or more of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; and wherein any of the carbon or hydrogen atoms in the above moieties are further substituted with halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides;

one or more alkali metal salts;

one or more organic co-solvents; and a metal polysulfide.

9. The electrolyte formulation of claim 8, wherein the cation of the one or more alkali metal salts is one or more of lithium, sodium, and magnesium.

10. The electrolyte formulation of claim 8, wherein the total molar concentration of the one or more alkali metal salts in the electrolyte formulation is between about 0.1 and about 2.

11. The electrolyte formulation of claim 8, wherein the organic co-solvent is one or more species selected from the group consisting of open-chain or cyclic carbonates, carboxylic acid esters, nitrites, ethers, sulfones, sulfoxides, lactones, dioxolanes, glymes, crown ethers, and any mixture thereof.

12. The electrolyte formulation of claim 8, wherein the organic co-solvent is between about 5 wt % to about 85 wt % of the total electrolyte mass.

13. The electrolyte formulation of claim 8, wherein the functionalized ionic liquid is between about 0.1 wt % to about 85 wt % of the total electrolyte mass.

14. The electrolyte formulation of claim 8, further comprising an organic-hybrid material covalently bonded to the ionic liquid in an amount between about 0.1 wt % to about 10 wt % of the total electrolyte mass.

15. The electrolyte formulation of claim 8, wherein the metal polysulfide is formed ex situ at a molar concentration between about 0.1 and 10.

16. An electrochemical cell comprising a positive electrode comprising an electroactive sulfur-containing material;

a negative electrode; and an electrolyte comprising a functionalized single ionic liquid molecule described by the formula $C^+A^-$, wherein $A^-$ is an anion selected from the group consisting of halides, nitrates, phosphates, imides, borates, phosphazines, acetates, and sulfonates; and $C^+$ is an organic cation selected from the group consisting of ammoniums, sulfoniums, phosphoniums, and any 5 or 6 membered heterocyclic ring having 1 to 3 heteroatoms as ring members selected from nitrogen, oxygen, and sulfur, wherein one or more of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; and wherein any of the carbon or hydrogen atoms in the above moieties are further substituted with halides, oxygen, nitrogen, sulfur, phosphorus, alkanes, esters, ethers, ketones, carbonyls, alkoxyalkanes, alkenes, alkynes, aryls, nitriles, silanes, sulfones, thiols, phenols, hydroxyls, amines, imides, aldehydes, carboxylic acids, carbonates, and acid anhydrides; one or more alkali metal salts; one or more metal polysulfides; and one or more organic co-solvents.

* * * * *